(12) United States Patent
Bui et al.

(10) Patent No.: US 11,016,584 B2
(45) Date of Patent: May 25, 2021

(54) ELECTRONIC DEVICE HAVING A CURVED DISPLAY AND CONTROL METHOD THEREOF

(71) Applicant: SAMSUNG ELECTRONICS CO., LTD., Suwon-si (KR)

(72) Inventors: Duc Tien Bui, Hanoi (VN); Tien Anh Le, Hanoi (VN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 16/139,651

(22) Filed: Sep. 24, 2018

(65) Prior Publication Data

US 2019/0146601 A1 May 16, 2019

(30) Foreign Application Priority Data

Nov. 10, 2017 (KR) .................. 10-2017-0149878

(51) Int. Cl.
*G06F 3/0488* (2013.01)
*G06F 3/0354* (2013.01)
*G06F 3/0484* (2013.01)
*G06F 3/0481* (2013.01)
*G06F 3/041* (2006.01)

(52) U.S. Cl.
CPC ........ *G06F 3/03545* (2013.01); *G06F 3/0416* (2013.01); *G06F 3/04817* (2013.01); *G06F 3/04842* (2013.01); *G06F 3/04886* (2013.01)

(58) Field of Classification Search
CPC .............. G06F 3/03545; G06F 3/0416; G06F 3/04817; G06F 3/04842; G06F 3/04886
See application file for complete search history.

(56) References Cited

U.S. PATENT DOCUMENTS

| | | |
|---|---|---|
| 8,564,551 B2 | 10/2013 | Park et al. |
| 2007/0129100 A1 | 6/2007 | Kim |
| 2011/0205163 A1 | 8/2011 | Hinckley et al. |
| 2015/0015512 A1* | 1/2015 | Kwak ............... G06F 3/0412 345/173 |
| 2015/0220171 A1 | 8/2015 | Cho |
| 2016/0334936 A1 | 11/2016 | Obata |

FOREIGN PATENT DOCUMENTS

| | | |
|---|---|---|
| EP | 0982678 A2 | 3/2000 |
| JP | 2011-248847 A | 12/2011 |
| WO | 2015/115527 A1 | 8/2015 |

* cited by examiner

*Primary Examiner* — Namitha Pillai
(74) *Attorney, Agent, or Firm* — Sughrue Mion, PLLC

(57) ABSTRACT

An electronic device and a method for controlling the same are provided. The electronic device includes a display including a main display area and an auxiliary display area extended from the main display area, a sensing part configured to detect a signal of an electronic pen located on the display, and a processor configured to control the electronic device according to the detected signal. The processor is further configured to, based on an area in which the signal is detected being a first area of the auxiliary display area, carry out a first function corresponding to the signal, and based on an area in which the signal is detected being a second area of the auxiliary display area, to carry out a second function corresponding to the signal.

12 Claims, 14 Drawing Sheets

(a)  (b)

(a)          (b)

ELECTRONIC DEVICE HAVING A CURVED DISPLAY AND CONTROL METHOD THEREOF

CROSS-REFERENCE TO RELATED APPLICATION

This application is based on and claims priority under 35 U.S.C. § 119(a) of a Korean Patent Application Number 10-2017-0149878, filed on Nov. 10, 2017, in the Korean Intellectual Property Office, and the disclosures of which is incorporated by reference herein in its entirety.

BACKGROUND

1. Field

The disclosure relates to an electronic device and a method for controlling the electronic device. More particularly, the disclosure relates to an electronic device having a curved display and a method for controlling the electronic device.

2. Description of Related Art

In recent years, a display of an electronic device such as a smartphone includes a main display area and an auxiliary display area. The auxiliary display area is implemented in a form of a curved surface.

Accordingly, the electronic device may provide various forms of UI through at least one of the main display area and auxiliary display area of the display. Further, the electronic device may detect a signal of an input device such as an electronic pen, and according to the detected signal, control a function of a UI displayed on at least one of the main display area and the auxiliary display area or a function of the electronic device.

In a case in which a signal generated from an input device such as an electronic pen is detected on the auxiliary display area, the electronic device may detect a signal of the input device only within a preset range. As described above, the electronic device may detect a signal of an input device located on the auxiliary display area within a preset range and thus, there is a problem that the electronic device is not used with respect to the auxiliary display area more efficiently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to allow an electronic device which includes a main display area and an auxiliary display area, and includes a display in which the auxiliary display area is implemented in a form of a curved surface to further easily detect a signal generated from an input device such as an electronic pen.

Another aspect of the disclosure is to allow an auxiliary display area which is implemented in a form of a curved surface to perform various control functions based on the detected signal of the input device.

In accordance with an aspect of the disclosure, an electronic device is provided. The electronic device includes a display including a main display area and an auxiliary display area extended from the main display area, a sensing part configured to detect a signal of an electronic pen located on the display, and a processor configured to control the electronic device according to the detected signal. The processor is further configured to, based on an area in which the signal is detected being a first area of the auxiliary display area, carry out a first function corresponding to the signal, and based on an area in which the signal is detected being a second area of the auxiliary display area, to carry out a second function corresponding to the signal.

The first area may be an area connected to the main display area based on a reference line from among the auxiliary display area. The second area may be an area disconnected from the main display area based on the reference line from among the auxiliary display area.

The reference line may be a line connecting points satisfying an equation shown below: $D1+D2=D3$. $D1$ is a shortest distance between a first point of a portion of the display from which a curved surface area starts and a second point at which the signal is detected. $D2$ is a shortest distance between the second point at which the signal is detected and an extended line that extends from a location of the electronic pen to the curved surface area in a vertical direction perpendicular to a horizontal direction, the main display area extending in the horizontal direction. $D3$ is a shortest distance between a point of the portion of the display from which the curved surface area starts and a third point at which the curved surface area ends.

The processor may be configured to, based on the signal being detected in the first area, select at least one object displayed on the auxiliary display area, and based on the signal being detected in the second area, to scroll at least one of the main display area and the auxiliary display area.

The processor may be configured to, based on the signal being detected in the first area, select at least one object displayed on the auxiliary display area, and based on the signal being detected in the second area, to display a user interface (UI) screen including at least one icon on the auxiliary display area.

The processor may be configured to, while the main display area and the auxiliary display area are deactivated, based on the signal being detected in the second area, activate the auxiliary display area to display a UI screen including at least one icon.

The auxiliary display area may include a first auxiliary display area which is configured to extend from one side of the main display area and a second auxiliary display which is configured to extend from an other side of the main display area, the first auxiliary display area including a first area and a second area, the second auxiliary display area including a first area and a second area. The processor may be configured to, while a content is displayed on the display, based on the signal being detected in the second area of the first auxiliary display area, carry out a first function for controlling a displaying of the content, and while a content is displayed on the display, based on the signal being detected in the second area of the second auxiliary display area, to carry out a second function for controlling a displaying of the content.

The auxiliary display area may be an edge area of the display.

In accordance with an aspect of the disclosure, a method for controlling an electronic device is provided. The method includes detecting a signal of an electronic pen located on a display including a main display area and an auxiliary display area configured to extend from the main display area and include a curved surface area, and controlling the electronic device according to the detected signal. The controlling may include, based on an area in which the signal is detected being a first area of the auxiliary display area, carrying out a first function corresponding to the signal, and based on an area in which the signal is detected being a second area, carrying out a second function corresponding to the signal.

The first area may be an area connected to the main display area based on a reference line from among the auxiliary display area. The second area may be an area disconnected from the main display area based on the reference line from among the auxiliary display area.

The reference line may be a line connecting points satisfying an equation shown below: $D1+D2=D3$. $D1$ is a shortest distance between a first point of a portion of the display from which a curved surface area starts and a second point at which the signal is detected. $D2$ is a shortest distance between the second point at which the signal is detected and an extended line that extends from a location of the electronic pen to the curved surface area in a vertical direction perpendicular to a horizontal direction, the main display area of the display extending in the horizontal direction. $D3$ is a shortest distance between a point of a portion of the display from which the curved surface area starts and a third point at which the curved surface area ends.

The controlling may include, based on the signal being detected in the first area, selecting at least one object displayed on the auxiliary display area, and based on the signal being detected in the second area, scrolling at least one of the main display area and the auxiliary display area.

The controlling may include, based on the signal being detected in the first area, selecting at least one object displayed on the auxiliary display area, and based on the signal being detected in the second area, displaying a user interface (UI) screen including at least one icon on the auxiliary display area.

The controlling may include, while the main display area and the auxiliary display area are deactivated, based on the signal being detected in the second area, activating the auxiliary display area to display a UI screen including at least one icon.

The auxiliary display area may include a first auxiliary display area which is configured to extend from one side of the main display area and a second auxiliary display which is configured to extend from an other side of the main display area, the first auxiliary display area including a first area and a second area, the second auxiliary display area including a first area and a second area. The controlling may include, while a content is displayed on the display, based on the signal being detected in the second area of the first auxiliary display area, carrying out a first function for controlling a displaying of the content, and while a content is displayed on the display, based on the signal being detected in the second area of the second auxiliary display area, carrying out a second function for controlling a displaying of the content.

The auxiliary display area may be an edge area of the display.

In accordance with an aspect of the disclosure, a computer program product that includes a non-transitory computer recording medium for storing a computer program that is capable of being executed by a user terminal is provided. The computer program includes an operation of detecting a signal of an electronic pen located on a display including a main display area and an auxiliary display area configured to extend from the main display area and include a curved surface area, and an operation of controlling the electronic device according to the detected signal. The operation of controlling may include, based on an area in which the signal is detected being a first area of the auxiliary display area, carrying out a first function corresponding to the signal, and based on an area in which the signal is detected being a second area of the auxiliary display area, carrying out a second function corresponding to the signal.

According to the various example embodiments described above, an electronic device which includes a main display area and an auxiliary display area, and includes a display in which an auxiliary display area is implemented in a form of a curved surface may detect a signal generated from an input device, such as an electronic pen, more easily.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following description taken in conjunction with the accompanying drawings, in which.

The same reference numerals are used to represent the same elements throughout the drawings.

DETAILED DESCRIPTION

The present disclosure may have several embodiments, and the embodiments may be modified variously. In the following description, specific embodiments are provided with accompanying drawings and detailed descriptions thereof. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

In the present disclosure, relational terms such as first and second, and the like, may be used to distinguish one entity from another entity, without necessarily implying any actual relationship or order between such entities. In embodiments of the present disclosure, relational terms such as first and second, and the like, may be used to distinguish one entity from another entity, without necessarily implying any actual relationship or order between such entities.

The terms used herein are solely intended to explain a specific exemplary embodiment, and not to limit the scope of the present disclosure. It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In an exemplary embodiment, 'a module' or 'a unit' performs at least one function or operation, and may be realized as hardware, such as a processor or integrated circuit, software that is executed by a processor, or a combination thereof. In addition, a plurality of 'modules' or a plurality of 'units' may be integrated into at least one module and may be realized as at least one processor except for 'modules' or 'units' that should be realized in a specific hardware.

Further, in embodiments of the present disclosure, when it is described that a portion is connected to another portion, the portion may be either connected directly to the other portion, or connected indirectly via another medium. Further, when a certain portion includes a certain element, unless specified to the contrary, this means that another element may be additionally included, rather than precluding another element.

Hereinafter, the present disclosure will be described in detail with reference to the accompanying drawings.

Figure 1:
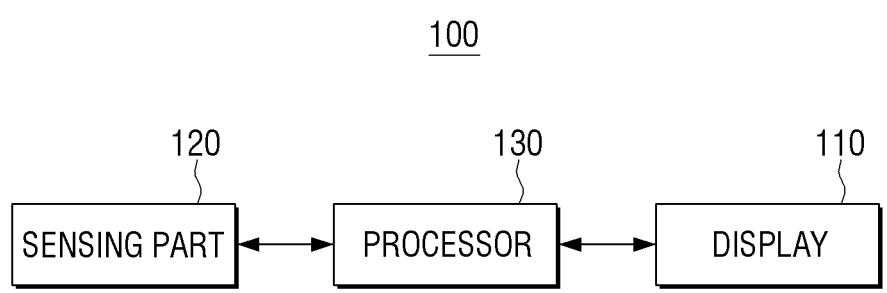
FIG. 1 is a block diagram of an electronic device according to an example embodiment.

FIG. 1 is a block diagram of an electronic device according to an example embodiment.

The electronic device 100 may receive a user command through an electronic pen or a touch input of a user. The electronic device 100 may, for example, be a portable terminal device such as a smartphone and a tablet PC. However, the example is not limited thereto, and the electronic device 100 may be a large-screen display device such as an electronic board which is capable of receiving a touch input.

As illustrated in FIG. 1, the electronic device may include a display 110, a sensing part 120, and a processor (e.g., including processing circuitry) 130. The processor may be implemented as at least one processor, and the sensing part may be the same as a sensor.

The display 110 may display a content received from an external server such as a content server (not illustrated), or a pre-stored content-related data. In addition, the display 110 may display a UI screen including at least one icon for controlling operations of the electronic device 100, or may display an execution screen corresponding to a selected icon.

The display 110 may include a main display area and an auxiliary display area which is formed to extend from the main display area and includes a curved surface area.

The auxiliary display area which is formed to extend from the main display area and includes a curved surface area may be formed to extend from at least one of left and right sides of the main display area.

However, the example is not limited thereto, and the auxiliary display area may be formed to extend from at least one of upper and lower sides of the main display area.

Figure 3:
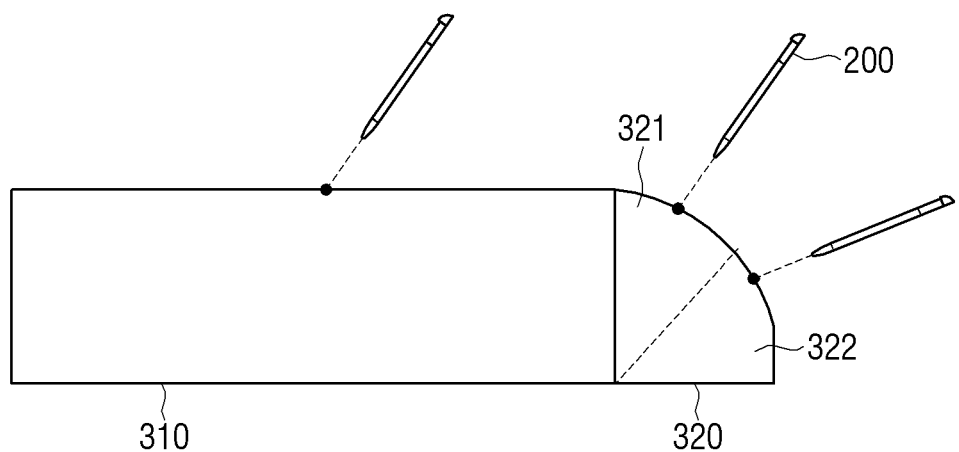
FIG. 3 is a diagram illustrating an example display of an electronic device according to an example embodiment.

The sensing part 120 may detect a signal of an electronic pen 200 which is located on the display 110 as illustrated in FIG. 3 which will be described later. The sensing part 120 and the display 110 may be implemented in a form of one touch screen.

In an implementation, the sensing part 120 may be implemented as a plurality of electrodes. The sensing part 120 may receive a signal transmitted from the electronic pen 200 approaching or coming in contact with the display 110 through at least one of the plurality of electrodes, and thereby detect a signal of the electronic pen 200 located on the display 110.

A technique of detecting a signal of the electronic pen 200 located on the display 110 is a well-known art and thus, the detailed description thereof will be omitted herein.

The electronic pen 200 may be, without a power supply, implemented as a passive type in which a pen is activated by a signal generated through the sensing part 120 of the electronic device 100 and operated or an active type in which a pen is provided with a power supply in itself and operated.

When a signal generated from the electronic pen 200 located on the display 110 is detected through the sensing part 120, the processor 130 may control the operations of the electronic device according to the detected signal.

When a signal is detected through the sensing part 120, the processor 130 may determine an area in which the signal is detected. As a result of determination, in a case where the area in which the signal is detected is a main display area of the display 110, the processor 130 may carry out a function corresponding to the signal in the main display area. For example, in a state in which a UI including at least one item is displayed in the main display area, when it is identified that a signal is detected in the main display area, the processor 130 may execute an item located in an area in which the signal is detected from among at least one item included in the displayed UI.

When it is identified that an area in which a signal is detected through the sensing part 120 is a preset first area from among the auxiliary display area, the processor 130 may carry out a first function corresponding to the signal. When it is identified that an area in which a signal is detected through the sensing part 120 is a preset second area from among the auxiliary display area, the processor 130 may carry out a second function corresponding to the signal.

The first area may be an area which is connected to the main display area based on a preset reference line from among the auxiliary display area. The second area may be an area which is disconnected from the main display area based on a preset reference line from among the auxiliary display area.

A reference line dividing the auxiliary display area into first and second areas may be a line connecting points satisfying the [mathematical formula 1] as shown below.

$$D1+D2=D3 \qquad \text{[Mathematical formula 1]}$$

The D1 refers to a shortest distance between a first point of a portion of the display from which a curved surface area starts and a second point at which a signal generated from the electronic pen 200 is detected.

The D2 refers to a shortest distance between the second point at which the signal generated from the electronic pen 200 is detected and a line that extends from a position of the electronic pen 200 to the curved surface area in a vertical direction perpendicular to a horizontal direction in which the main display area extends.

The D3 refers to a shortest distance between a point of the portion of the display from which the curved surface area starts and a third point at which the curved surface area ends.

Accordingly, when it is identified that a signal generated from the electronic pen 200 is detected in the auxiliary display area, the processor 130 may identify whether the area at which the signal is detected is a first area or a second area based on a reference line set by the mathematical formula 1 described above.

As described above, when it is identified that a signal generated from the electronic pen 200 is detected in a first area or a second area of the auxiliary display area, the processor 130 may carry out a function corresponding to the detected signal through the example embodiment as described below.

In an implementation, when it is identified that a signal generated from the electronic pen 200 is detected in the first area of the auxiliary display area, the processor 130 may select an object corresponding to a point at which the signal is detected in the first area from among at least one object displayed in the auxiliary display area, and execute the selected object.

When it is identified that a signal generated from the electronic pen 200 is detected in the second area of the auxiliary display area, the processor 130 may carry out an operation of scrolling at least one of the main display area and the auxiliary display area.

In another implementation, in a state in which the main display area and the auxiliary display area are deactivated, when a signal generated from the electronic pen 200 is detected in the second area of the auxiliary display area, the processor 130 may activate the auxiliary display area to display a UI screen including at least one icon.

In another implementation, when a signal generated from the electronic pen 200 is detected in the second area of the auxiliary display area, the processor 130 may carry out a different function.

In detail, the auxiliary display area may include a first auxiliary display area which is formed to extend from one side of the main display area and a second auxiliary display area which is formed to extend from the other side of the main display area.

In a state in which a content is displayed on the display 110 including the main display area and the auxiliary display area, when a signal generated from the electronic pen 200 is detected in the second area of the first auxiliary display area, the processor 130 may carry out a first function for controlling a displaying of the content.

In a state in which a content is displayed on the display 110 including the main display area and the auxiliary display area, when a signal generated from the electronic pen 200 is detected in the second area of the second auxiliary display area, the processor 130 may carry out a second function for controlling a displaying of the content.

For example, the display 110 may display a web page screen through at least one of the main display area and the auxiliary display area. In a state that the web page screen is displayed, when a signal generated from the electronic pen 200 is detected in the second area of the first auxiliary display area, the processor 130 may carry out a first function for moving the web page screen up, down, left, and right.

When a signal generated from the electronic pen 200 is detected in the second area of the second auxiliary display area, the processor 130 may carry out a second function for moving the web page to a start page or last page of the web page screen.

Figure 2:
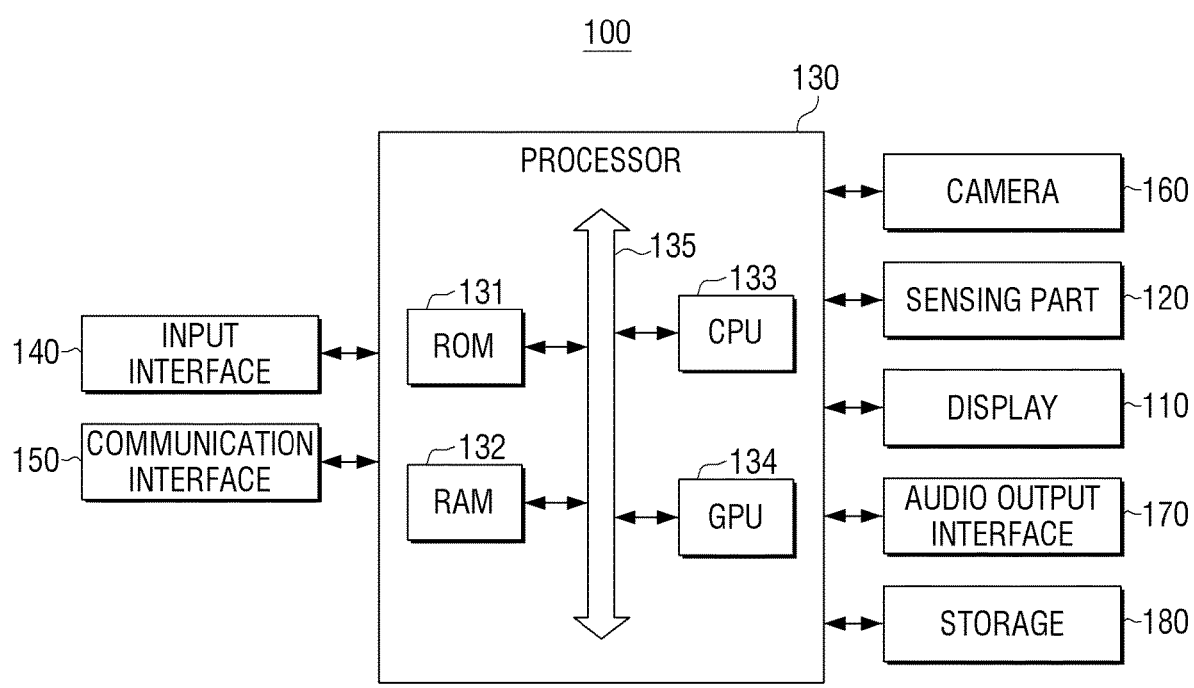
FIG. 2 is a detailed block diagram of an electronic device according to an example embodiment.

FIG. 2 is a detailed block diagram of an electronic device, according to an example embodiment.

As illustrated in FIG. 2, the electronic device 100 may further include an input interface 140, a communication interface 150, a camera 160, an audio output interface 170, and a storage 180 in addition to the elements described above.

The input interface 140 may receive a user command, and may be an input means for receiving selection commands according to various user manipulations of a user and transferring the received selection commands to the processor 130. The input interface 140 may be realized, as non-limiting examples, as a touch pad capable of receiving a touch input, a key pad including various function keys, number keys, character keys, etc.

The communication interface 150 may communicate with a terminal capable of performing wireless communication (not illustrated), a content server providing a content (not illustrated), a web server providing a web content, etc.

The communication interface 150 may be implemented as communication modules such as a near-field wireless communication module (not illustrated) and a wireless communication module (not illustrated). In this example, the near field wireless communication module (not illustrated) is a communication module which performs wireless communication with a terminal (not illustrated) located nearby, which may be, for example, a Bluetooth, a ZigBee, a near field communication (NFC), and etc. The wireless communication module (not illustrated) may access a mobile communication network according to various mobile communication standards, such as a Wi-Fi, a 3rd Generation (3G), a 3rd Generation Partnership Project (3GPP), a Long Term Evolution (LTE), and the like, and communicate with a content server (not illustrated), a web server (not illustrated), etc.

The camera 160 is to photograph still images or moving images according to the user command and may be implemented in plural like a front camera and a rear camera.

The audio output interface 170 may output an audio signal which is processed from audio data included in a content requested by a user.

The storage 180 may store an operating program for driving the electronic device 100, an execution program for executing a plurality of applications, a content, data, and etc.

In this regard, the operating program may be a program which is, when the electronic device 100 is turned on, read in the storage 180 and compiled to operate each configuration of the electronic device 100.

Meanwhile, the processor 130 described above may include a RAM 131, a ROM 132, a CPU 133, and a GPU 134. The RAM 131, the ROM 132, the CPU 133, and the GPU 134 may be interconnected with each other via a bus.

The CPU 133 accesses the storage 180 and performs booting using the O/S stored in the storage 180. In addition, the CPU 133 performs various operations using various programs, contents, and data stored in the storage 180.

The GPU 134 generates a display screen including a variety of objects, such as an icon, an image, a text, and the like. In more detail, the GPU 134 calculates an attribute value, such as a coordinate value, shape, size and color of each of the objects to be displayed, according to a layout of a screen based on the received control command, and generates a display screen of various layouts including the object based on the calculated attribute value.

The ROM 131 may store a command set, and the like for system booting. If a turn-on command is input and the power is supplied, the CPU 133 copies the O/S stored in the memory 180 into the RAM 124 according to the command stored in the ROM 131, and boots the system by executing the O/S. When the booting is completed, the CPU 133 may copy the various programs stored in the storage 180 to the RAM 132, and perform various operations by implementing the programs copied to the RAM 132.

The processor 130 may be implemented by a system-on-a chip (SOC) or a system on chip (Soc) by being combined with each of configurations described above.

Additionally, the operations of the above-described processor 130 may be performed by a program stored in the storage 180. In this regard, the storage 180 may be implemented by using at least one of a memory card (e.g., an SD card and a memory stick) which can be mounted in or dismounted from a read only memory (ROM) 131, a random access memory (RAM) 132, or the electronic apparatus 100, a non-volatile memory, a volatile memory, a hard disk drive (HDD), and a solid state drive (SSD).

The respective configurations of the electronic device 100 according to an example embodiment have been described above. Hereinafter, it will be described in detail an example of, in a case in which a signal generated from the electronic pen 200 is detected in an auxiliary display area of the electronic device 100, identifying whether the signal is detected in a first area or a second area of the auxiliary display area.

FIG. 3 is a diagram illustrating an example display of an electronic device according to an example embodiment.

As illustrated in FIG. 3, the display 110 may include a main display area 310 and an auxiliary display area 320. As described above, the auxiliary display area 320 may be formed to extend from the main display area 310.

In detail, the auxiliary display area 320 may be formed to extend from one side of the main display area 310 or may be formed to extend from the opposite sides of the main display area 310.

Accordingly, the electronic device 100 may, based on an area in which a signal generated from the electronic pen 200 is detected, identify whether the signal is detected in the main display area 310 or the auxiliary display area 320, and carry out a function according to the signal in the identified area.

The above-described auxiliary display area 320 may be divided into first and second areas 321 and 322 based on a reference line connecting points identified based on the mathematical formula 1 described above.

In a case in which a signal generated from the electronic pen 200 is detected in the first area 321 of the auxiliary display area 320, the electronic device 100 may carry out a first function according to the signal. In a case in which a signal generated from the electronic pen 200 is detected in the second area 322 of the auxiliary display area 320, the electronic device 100 may carry out a second function according to the signal.

Figure 4:
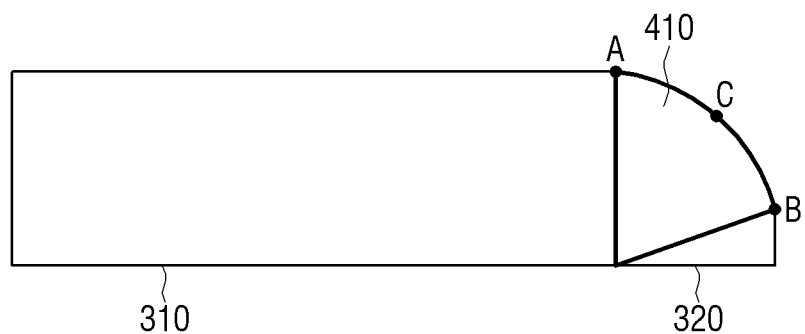
FIGS. 4 and 5 are diagrams illustrating examples of determining a reference line for dividing an auxiliary display area in an electronic device into a first area and a second area according to various example embodiments.
Figure 5:
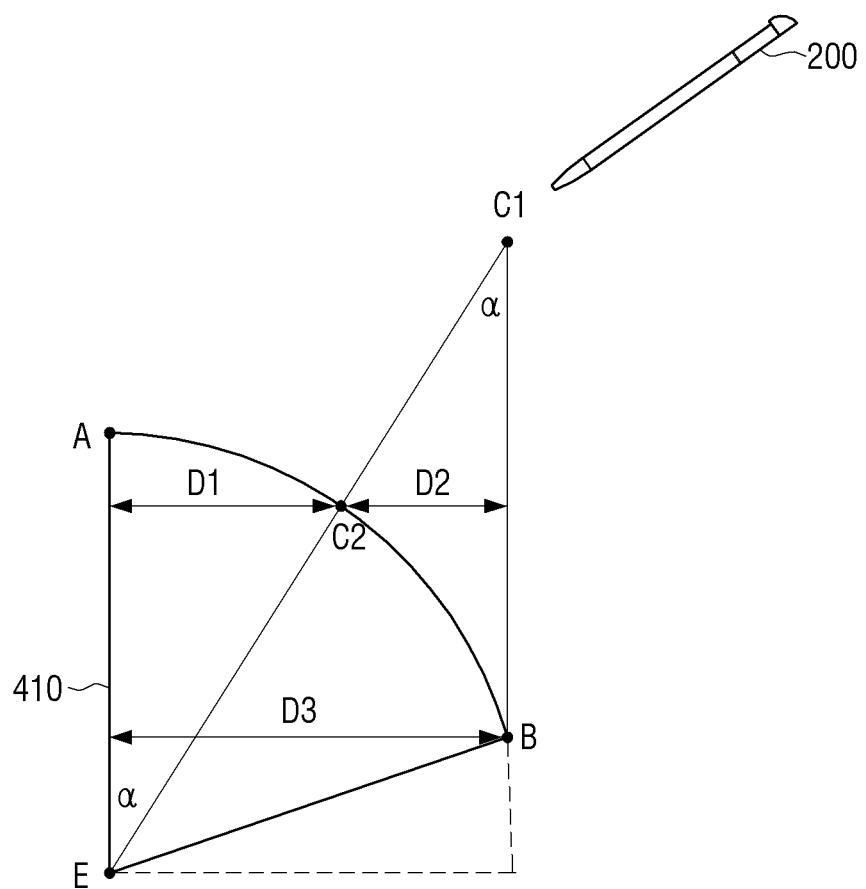

FIGS. 4 and 5 are diagrams illustrating examples of determining a reference line for dividing an auxiliary display area in an electronic device into a first area and a second area according to various example embodiments.

As illustrated in FIG. 4, the auxiliary display area 320 which is formed to extend from the main display area 310 may include a curved surface area which is capable of detecting a signal of an electronic pen 200. The point A is a point on the display where the curved surface area 410 starts. The point B is a point on the display where the curved surface area 410 ends. In a case in which a signal generated from the electronic pen 200 is detected in the curved surface area 410, the point C may be a reference point of a reference line for determining whether the detected signal is detected in the first area 321 or the second area 322.

Accordingly, in a case in which the point C is continued in one side direction, a reference line which serves as a reference for determining whether a signal of the electronic pen 200 is detected in the first area 321 or the second area 322 may be identified.

In detail, as illustrated in FIG. 5, the reference point for determining whether a signal generated in the electronic pen 200 is detected in the first area 321 or the second area 322 may be a point C2 where distances of D1 and D2 correspond to a distance of D3. That is, the reference point may be a point prior to the distance of D3 is longer than the distances of D1 and D2.

In detail, the electronic device 100 may calculate a shortest distance (D1) between a first point of a portion of the display where the curved surface area 410 starts and an arbitrary second point (C2) of the curved surface area 410. In addition, the electronic device 100 may calculate a shortest distance (D2) between the arbitrary second point (C2) and an extended line extending from an arbitrary position (C1) to the curved surface area 410 in a vertical direction perpendicular to a horizontal direction in which the main display area extends.

The arbitrary second point (C2) is a point where it is predicted that a signal generated from the electronic pen 200 is detected at the arbitrary position (C1) at which the electronic pen 200 is present.

In addition, the arbitrary position (C1) of the electronic pen 200 may be a point at which an extended line which extends by passing through the second point at which a signal is detected from the point E in a straight-lined direction and an extended line which extends from a point B where the curved surface area 410 ends to a straight-lined direction meet.

In addition, the electronic device 100 may calculate a shortest distance (D3) between a point of the portion of the display where the curved surface area 410 of the auxiliary display area 320 starts and the point B where the curved surface area 410 ends.

Thereafter, the electronic device 100 may identify whether a sum of the calculated shortest distance (D1) and the calculated shortest distance (D2) and the calculated shortest distance (D3) are identical to each other. As a result of identification, if the sum of the shortest distance (D1) and the shortest distance (D2) is larger than the shortest distance (D3), the electronic device 100 may change the second point (C2) at which it is predicted that a signal generated in the arbitrary position (C1) of the electronic pen 200 is detected, and re-perform a series of performing operations described above, based on the changed second point (C2).

When the sum of the shortest distance (D1) and the shortest distance (D2) are identical to the shortest distance (D3) through the series of performing operations, the electronic device 100 may identify the second point (C2) used in the corresponding condition as a reference point for dividing the auxiliary display area 320 into the first and second areas 321 and 322. Thereafter, the electronic device 100 may identify that a line connecting the reference point is a reference line for dividing the auxiliary display area 320 into the first and second areas 321 and 322.

After identifying a reference point for dividing the auxiliary display area 320 into the first and second areas 321 and 322, when a signal generated from the electronic device 200 is detected on the auxiliary display area 320, the electronic device 100 may identify which of the first area 321 and the second area 322 the signal generated from the electronic pen 200 is generated from, based on the predetermined reference line.

That is, the electronic device 100 may identify whether a point where a signal generated from the electronic pen 200 is detected is included in the first area 321 connected to the main display area 310 based on the predetermined reference line, and according to whether the point is located in the second area 322 disconnected from the main display area 321, identify whether the signal is detected at the first point 321 or the second point 322.

Further, in a case in which a signal generated from the electronic pen 200 is detected in the auxiliary display area 320, the electronic device 100 may identify whether the signal generated from the electronic pen 200 is detected in the first area 321 or the second area 322 of the auxiliary display area 320.

Figure 6:
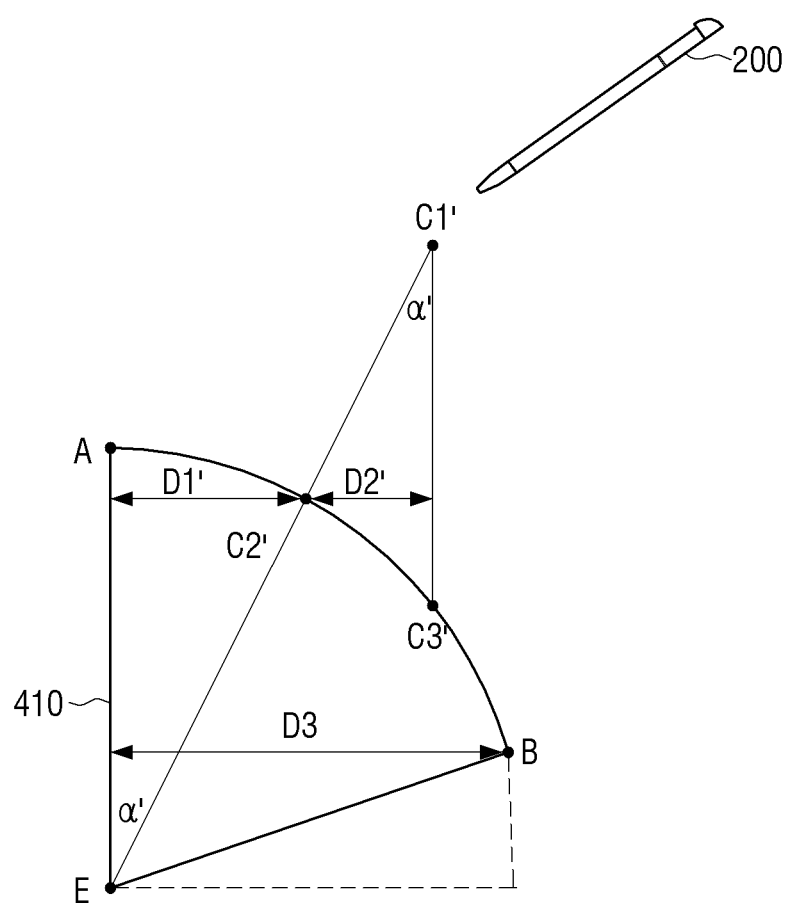
FIGS. 6 and 7 are diagrams illustrating example operations of detecting a signal of an electronic pen in an auxiliary display area of an electronic device according to various example embodiments.
Figure 7:
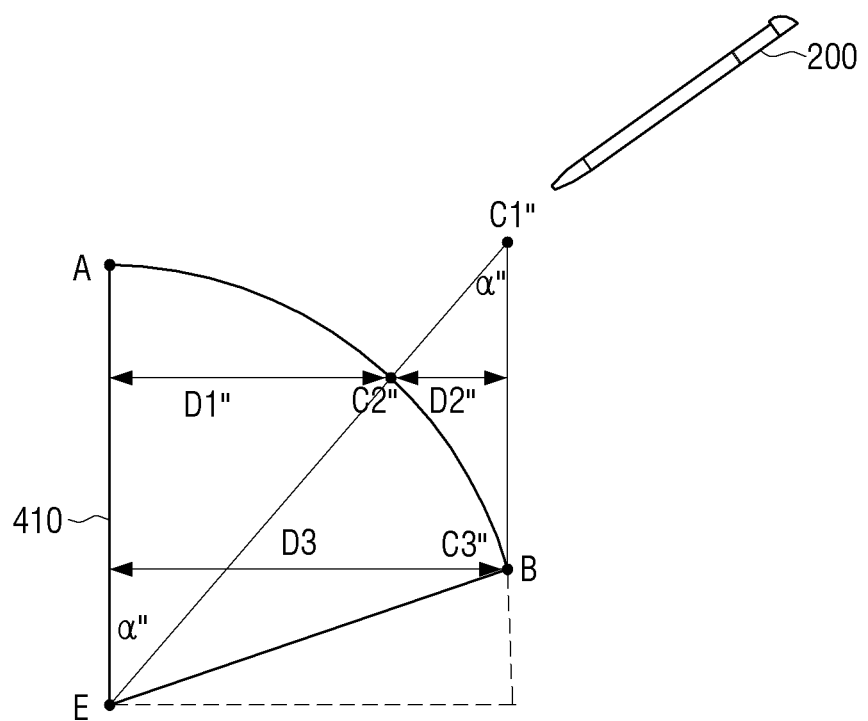

FIGS. 6 and 7 are diagrams illustrating example operations of detecting a signal of an electronic pen in an auxiliary display area of an electronic device according to various example embodiments.

As illustrated in FIG. 6, a signal generated in the electronic pen 200 may be detected at a particular point (hereinafter referred to as "second point") of the auxiliary display area 320 from among the main display area 310 and the auxiliary display area 320 included in the display 110.

When a signal of the electronic pen 200 is detected at the second point (C2'), the electronic device 100 may calculate a shortest distance (D1') between the first point of the portion of the display where the curved surface area 410 starts and the second point (C2') where the signal of the electronic pen 200 is detected.

In addition, the electronic device 100 may calculate a shortest distance (D2') between the second point (C2') where the signal of the electronic pen 200 is detected and an extended line extending from the point C1' at which the electronic pen 200 is located to the curved surface area 410 in a vertical direction.

The point at which the electronic pen 200 is located (C1') may be a point at which an extended line which extends by passing through the second point (C2') at which a signal of the electronic pen 200 is detected from the point E in a straight-lined direction and an extended line which extends from a point C3' in a vertical direction meet.

In addition, the electronic device 100 may calculate a shortest distance (D3) between a point of the portion of the display where the curved surface area 410 starts and a third point (B) where the curved surface area 410 ends.

Thereafter, the electronic device 100 may identify whether the sum of D1 and D2 satisfies D3 based on the mathematical formula 1 described above. As a result of identification, if the sum of D1 and D2 is less than D3, the electronic device 100 may identify that a signal of the electronic pen 200 detected in the auxiliary display area 320 is detected in the first area 321 of the auxiliary display area 320.

As illustrated in FIG. 7, a signal generated in the electronic pen 200 may be detected at a particular point (hereinafter referred to as "second point") of the auxiliary display area 320 from among the main display area 310 and the auxiliary display area 320 included in the display 110.

When a signal of the electronic pen 200 is detected at the second point (C2"), the electronic device 100 may calculate a shortest distance (D1") between the first point of the portion of the display where the curved surface area 410 starts and the second point (C2") where the signal of the electronic pen 200 is detected.

In addition, the electronic device 100 may calculate a shortest distance (D2") between the second point (C2") where the signal of the electronic pen 200 is detected and an extended line extending from the point C1" at which the electronic pen 200 is located to the curved surface area 410 in a vertical direction.

The point at which the electronic pen 200 is located (C1") may be a point at which an extended line which extends by passing through a second point (C2") at which a signal of the electronic pen 200 is detected from the point E in a straight-lined direction and an extended line which extends from the third point B where the curved surface area 410 ends to a straight-lined direction meet.

In addition, the electronic device 100 may calculate a shortest distance (D3") between a point of the portion of the display where the curved surface area 410 starts and the third point (B) where the curved surface area 410 ends.

Thereafter, the electronic device 100 may identify whether the sum of D1 and D2 satisfies D3 based on the mathematical formula 1 described above. As a result of identification, if the sum of D1 and D2 corresponds to D3, the electronic device 100 may identify that a signal of the electronic pen 200 detected in the auxiliary display area 320 is detected in the first area 322 of the auxiliary display area 320.

When it is identified that the signal of the electronic pen 200 is detected in the first area 321 or the second area 322 of the auxiliary display area 320, the electronic device 100 may carry out a first function or a second function according to a signal of the electronic pen detected in the first area 321 or the second area 322 of the auxiliary display area 320.

Hereinafter, an operation of carrying out a function according to a signal of the electronic pen 200 detected in the first area 321 or the second area 322 of the auxiliary display area 320 in the electronic device 100 will be described in detail.

FIGS. 8-13 are diagrams illustrating examples of carrying out a function according to a signal of an electronic pen detected through an auxiliary display area in an electronic device according to various example embodiments. The examples will be described with reference to FIGS. 3-7.

Figure 8:
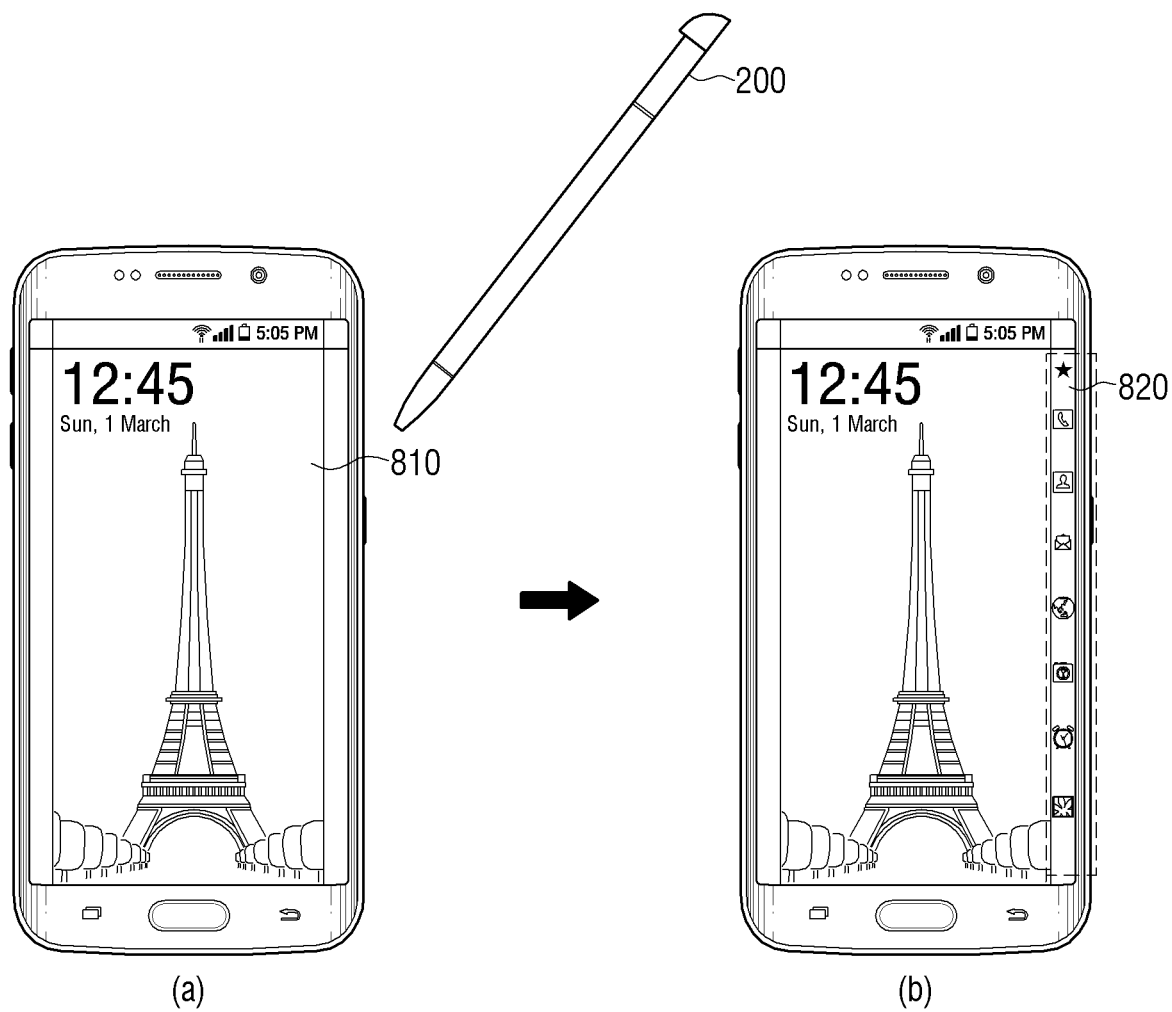
FIGS. 8-13 are diagrams illustrating examples of carrying out a function according to a signal of an electronic pen detected through an auxiliary display area in an electronic device according to various example embodiments.

As illustrated in section (a) of FIG. 8, the electronic device 100 may display a home screen 810 through the display 110 including the main display area 310 and the auxiliary display area 320.

In a state that the home screen 810 is displayed, a signal generated from the electronic pen 200 may be detected through the auxiliary display area 320.

When a signal of the electronic pen 200 is detected, the electronic device 100 may identify whether a signal of the electronic pen 200 detected through the auxiliary display area 320 is detected in the first area 321 or the second area 322 of the auxiliary display area 320.

An operation of identifying whether a signal of the electronic pen 200 is detected in the first area 321 or the second area 322 of the auxiliary display area 320 is described in detail above, and thus the detailed description thereof will be omitted herein.

As a result of identification, when it is identified that the signal of the electronic pen 200 is detected in the second area 322 of the auxiliary display area 320, the electronic device 100 may display a UI screen 820 including an icon corresponding to each of a plurality of applications through the auxiliary display area 320.

That is, when it is identified that a signal of the electronic pen 200 is detected in the second area 322 of the auxiliary display area 320, the electronic device 100 may display the home screen 810 on the main display area 310, and display a UI screen 820 including an icon corresponding to each of the plurality of applications on the auxiliary display area 320.

In a case in which the UI screen 820 is displayed on the auxiliary display area 320, the electronic device 100 may display the home screen 810 on the main display area 310 through the example embodiment as shown below.

In an implementation, the electronic device 100 may display, on the main display area 310, the home screen 810 with respect to a remaining area from which an area displayed on the auxiliary display area 320 is removed from among an entire area of the home screen 810 displayed on the display 110.

In another implementation, the electronic device 100 may adjust a size of the home screen 810 displayed on the display 110 to a size capable of being displayed on the main display area 310 and display it.

In a state in which the home screen 810 is displayed, when a signal generated from the electronic pen 200 is detected through the auxiliary display area 320, the electronic device 100 may display the home screen 810 on the main display area 310, and display a UI screen 820 including an icon corresponding to each of a plurality of applications on the auxiliary display area 320.

Figure 9:
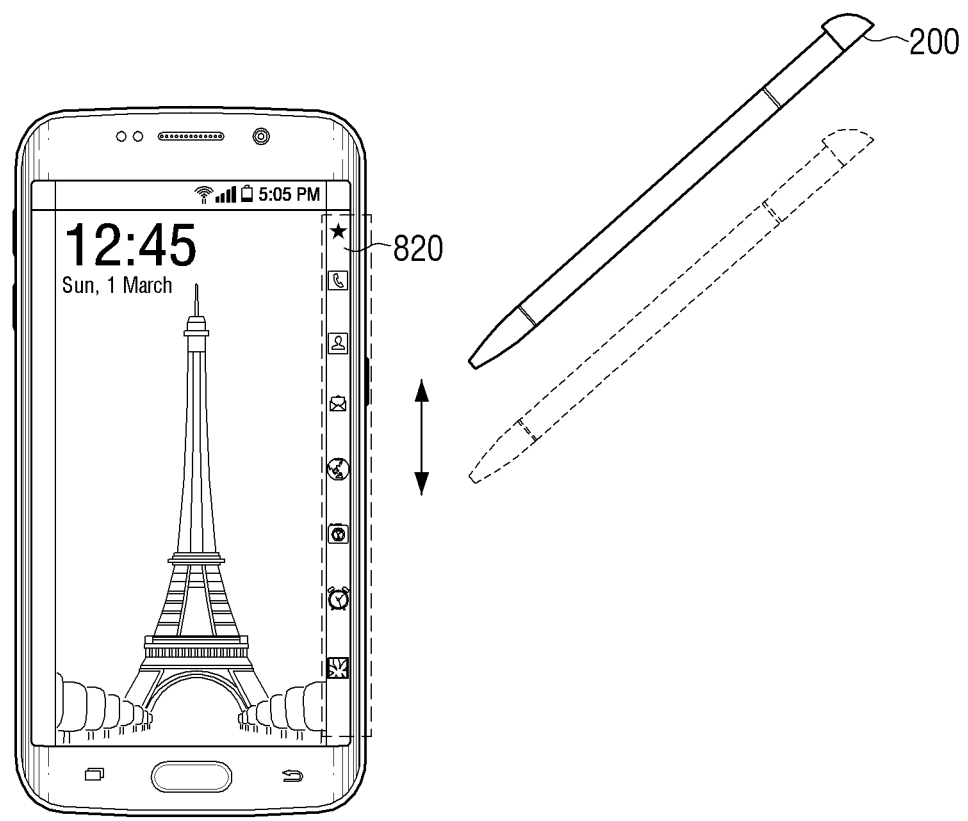

As described above, in a state in which the home screen 810 is displayed on the main display area 310 and the UI screen 820 including an icon corresponding to each of a plurality of applications is displayed on the auxiliary display area 320, the electronic device 100 may, as illustrated in FIG. 9, detect a signal generated from the electronic pen 200 from the auxiliary display area 320.

When the signal of the electronic pen 200 is detected, the electronic device 100 may identify whether the signal is detected in the first area 321 or the second area 322 of the auxiliary display area 320.

An operation of identifying whether a signal of the electronic pen 200 is detected in the first area 321 or the second area 322 of the auxiliary display area 320 is described in detail above, and thus the detailed description thereof will be omitted herein.

As a result of identification, when it is identified that the signal of the electronic pen 200 is detected in the first area 321 of the auxiliary display area 320, the electronic device 100 may select an icon at a position near a point at which the signal of the electronic pen 200 is detected from among a plurality of icons included in the UI screen 820 displayed on the auxiliary display area 320, and execute an application corresponding to the selected icon.

When it is identified that the signal of the electronic pen 200 is detected in the second area 322 of the auxiliary display area 320, the electronic device 100 may carry out an operation for scrolling the UI screen 820 displayed on the auxiliary display area 320.

That is, after a signal of the electronic pen 200 is detected in the second area 322 of the auxiliary display area 320, when a signal according to up-and-down movement of the electronic device 200 is detected, the electronic device 100 may scroll the UI screen 820 displayed on the auxiliary display area 320 in a direction corresponding to a direction of the up-and-down movement of the electronic pen 200.

Figure 10:
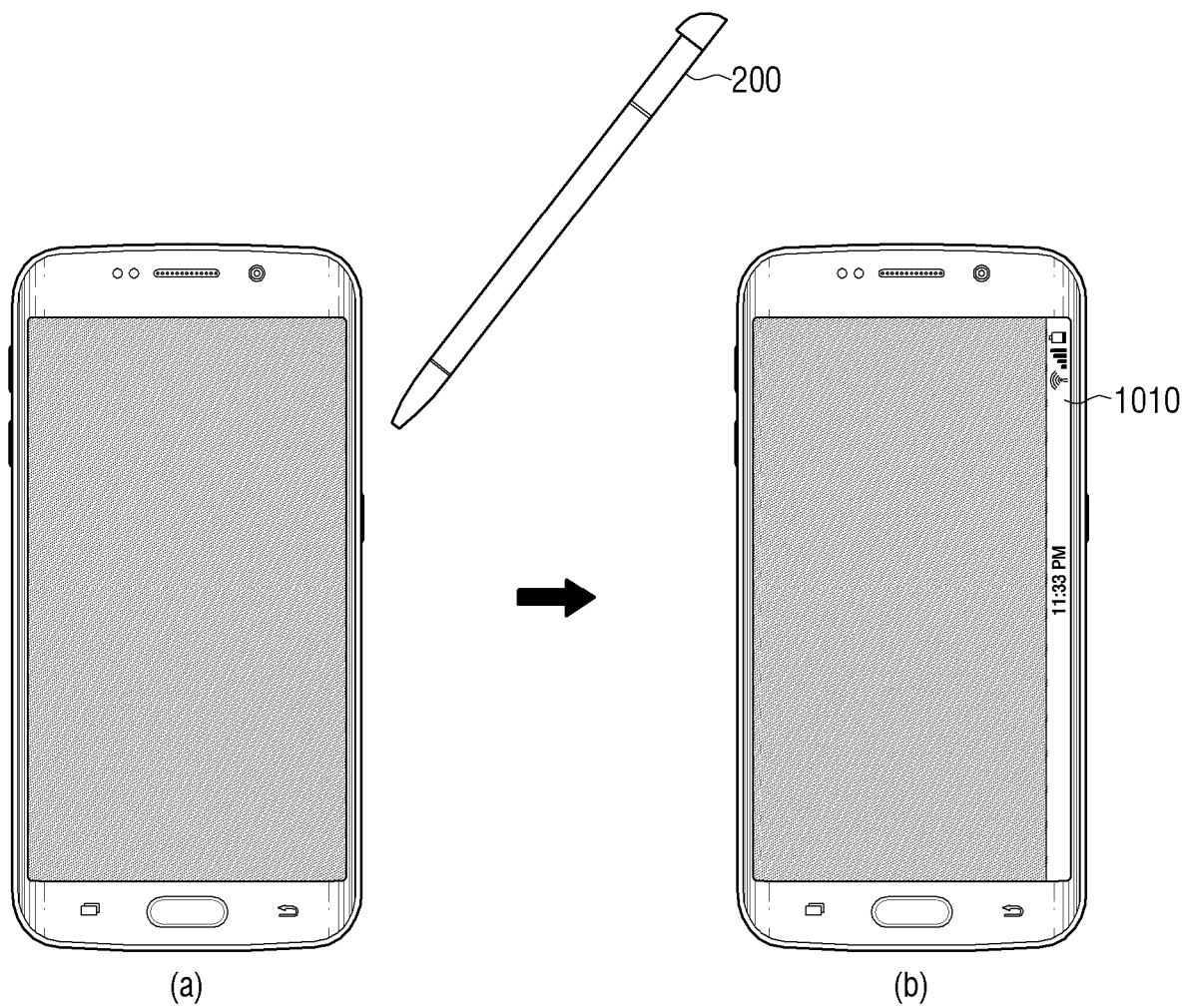

As illustrated in section (a) of FIG. 10, in a state in which the display 110 including the main display area 310 and the auxiliary display area 320 is a black screen mode, a signal generated from the electronic pen 200 may be detected through the auxiliary display area 320.

In general, the black screen mode may be a mode in which a power is not supplied to the display 110 including the main display area 310 and the auxiliary display area 320 or a mode in which a power corresponding to a standby power of a minimum unit is supplied to at least one of the main display area 310 and the auxiliary display area 320.

In an example embodiment, the black screen mode may be a state mode in which a power corresponding to a standby power of a minimum unit is supplied.

When a signal of the electronic pen 200 is detected through the auxiliary display area 320 in the black screen mode, the electronic device 100 may identify whether a signal of the electronic pen 200 detected through the auxiliary display area 320 is detected in the first area 321 or the second area 322 of the auxiliary display area 320.

An operation of identifying whether a signal of the electronic pen 200 is detected in the first area 321 or the second area 322 of the auxiliary display area 320 is described in detail above, and thus the detailed description thereof will be omitted herein.

As a result of identification, when it is identified that the signal of the electronic pen 200 is detected in the second area of the auxiliary display area 320, the electronic device 100 may activate the auxiliary display area 320 in the black screen mode. Thereafter, as illustrated in section (b) of FIG. 10, the electronic device 100 may display an execution screen UI 1010 for a preset application from among a plurality of applications through the activated auxiliary display area 320.

However, the example is not limited thereto. In a state in which the electronic device 100 is in a black screen mode, when a signal generated from the electronic pen 200 is detected through the auxiliary display area 320, the electronic device 100 may activate the auxiliary display area 320, and display the execution screen UI 1010 with respect to a preset application from among a plurality of applications through the activated auxiliary display area 320.

Figure 11:
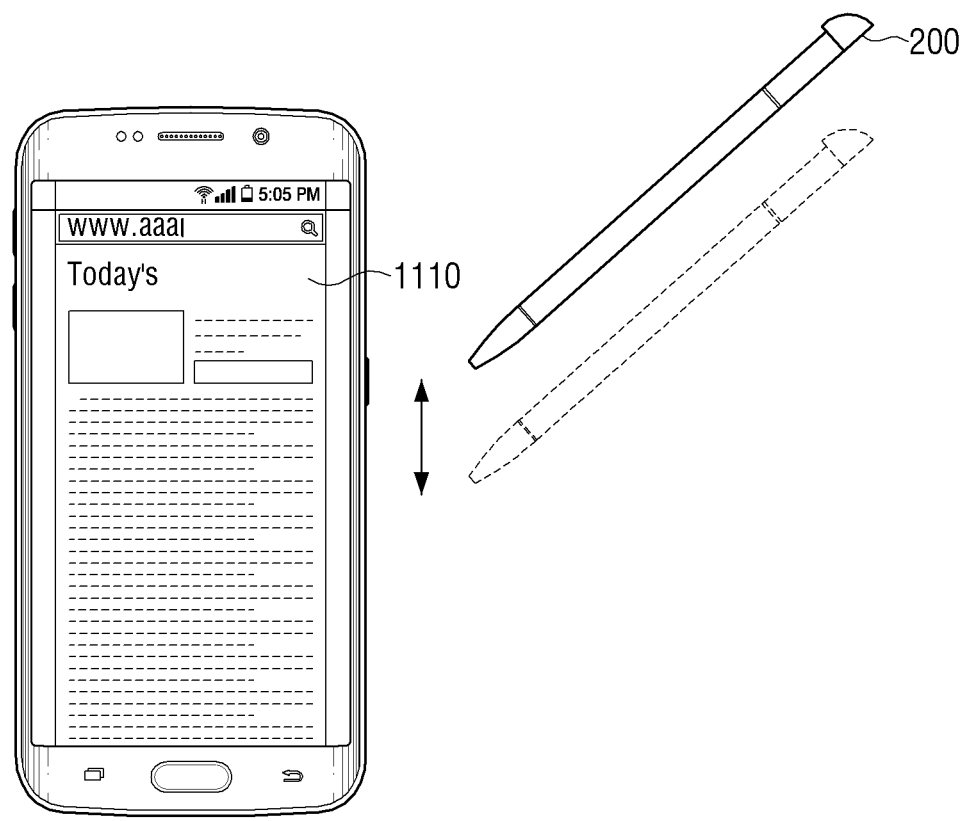

As illustrated in FIG. 11, in a state in which a web page screen 1110 is displayed on the display 110 including the main display area 310 and the auxiliary display area 320, a signal generated from the electronic pen 200 may be detected in the auxiliary display area 320.

The auxiliary display area 320 may be formed to extend from each of the opposite sides of the main display area 310. A signal of the electronic pen 200 may be detected through the auxiliary display area 320 extended from one side of the main display area 310.

The electronic device 100 may identify whether the detected signal is detected in the first area 321 or the second area 322 of the auxiliary display area 320.

An operation of identifying whether a signal of the electronic pen 200 is detected in the first area 321 or the second area 322 of the auxiliary display area 320 is described in detail above, and thus the detailed description thereof will be omitted herein.

As a result of identification, when it is identified that the signal of the electronic pen 200 is detected in the second area 322 of the auxiliary display area 320, the electronic device 100 may carry out an operation for scrolling the web page screen 1110 displayed on the display 110 including the main display area 310 and the auxiliary display area 320.

That is, after identifying that a signal of the electronic pen 200 is detected in the second area 322 of the auxiliary display area 320 extended from one side of the main display area 310, when a signal according to an up-and-down movement of the electronic pen 200 is detected, the electronic device 100 may scroll the web page screen 1110 in a direction corresponding to a direction of the up-and-down movement of the electronic pen 200 and display the scrolled web page screen 111.

As illustrated in FIG. 11, in a state in which the web page screen 1110 is displayed through the display 110 including the main display area 310 and the auxiliary display area 320, the electronic device 100 may detect a signal of the electronic pen 200 through the auxiliary display area 320 extended from the other side of the main display area 310.

Figure 12:
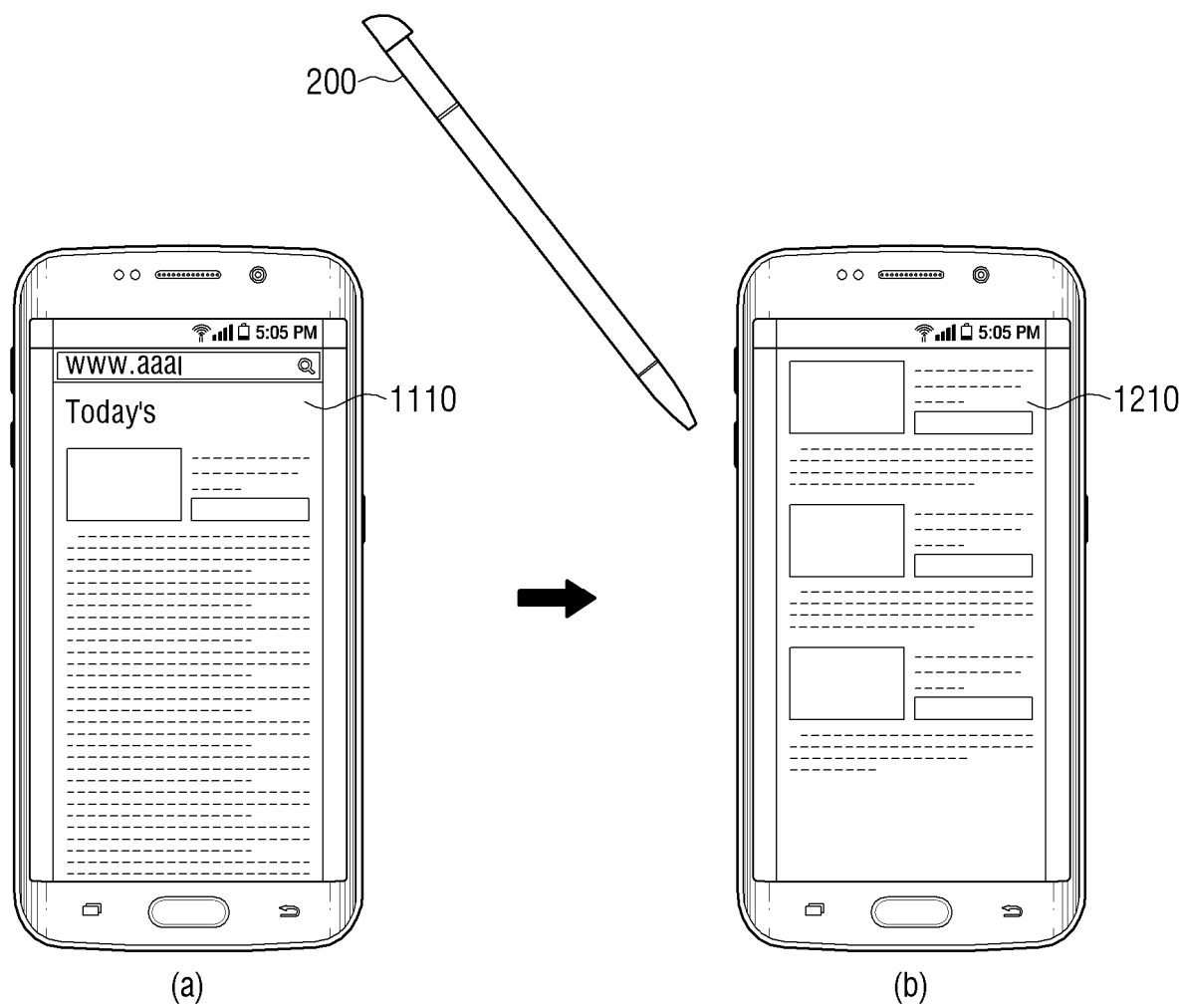

That is, as illustrated in section (a) of FIG. 12, in a state in which the web page screen 1110 is displayed through the display 110, the electronic device 100 may detect a signal of the electronic pen 200 through the auxiliary display area 320 extended from the other side of the main display area 310.

When a signal of the electronic pen 200 is detected through the auxiliary display area 320 extended from the other side of the main display area 310, the electronic device 100 may identify whether the detected signal is detected in the first area or second area 322 of the auxiliary display area 320.

An operation of identifying whether a signal of the electronic pen 200 is detected in the first area 321 or the second area 322 of the auxiliary display area 320 is described in detail above, and thus the detailed description thereof will be omitted herein.

As a result of identification, when it is identified that a signal of the electronic pen 200 is detected in the second area 322 of the auxiliary display area 320, the electronic device 100 may convert the web page screen 1110 displayed on the display 110 to a web page screen 1210 corresponding a start page or last page of the corresponding web page screen 1110, and display the web page screen 1210.

However, the example is not limited thereto. When it is identified that a signal of the electronic pen 200 is detected in the second area 322 of the auxiliary display area 320, the electronic device 100 may convert the web page screen 1110 displayed on the display 110 to a web page screen 1210 corresponding a previous page or next page of the corresponding web page screen 1110, and display the web page screen 1210.

Figure 13:
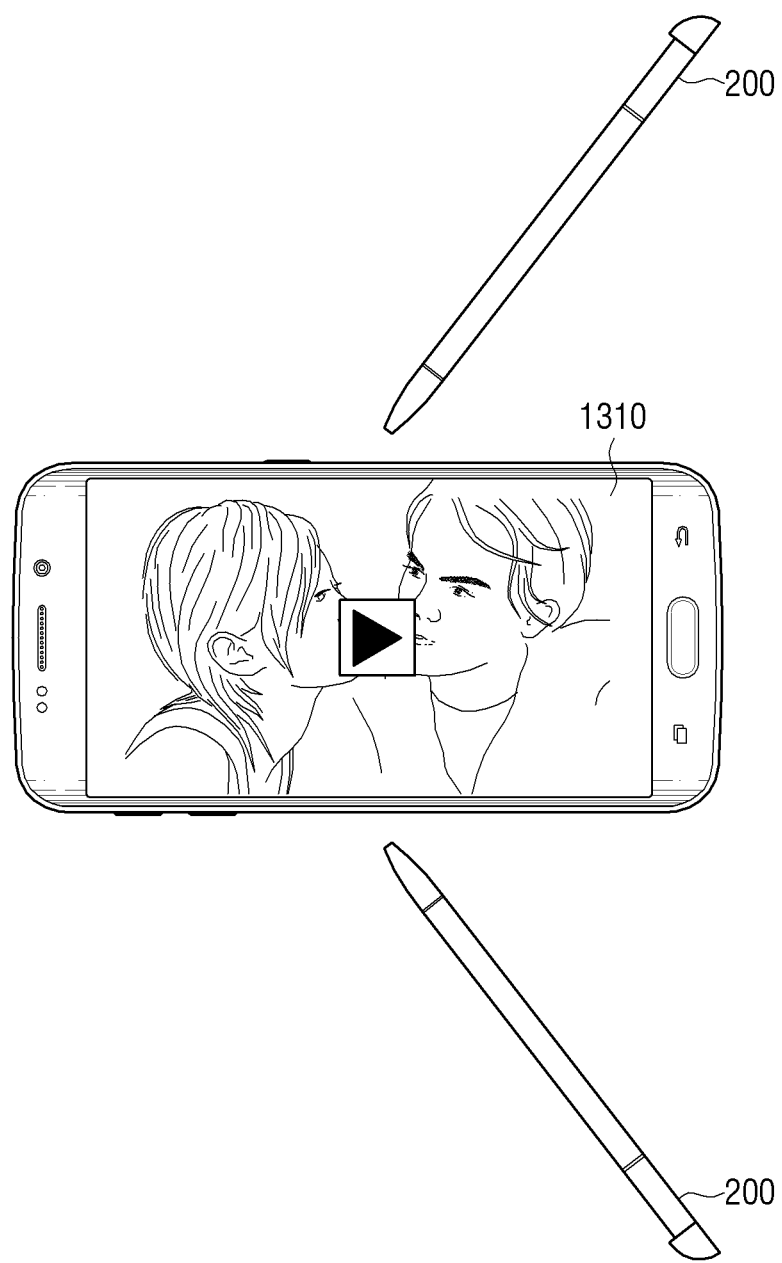

As illustrated in FIG. 13, in a state in which a content image 1310 is displayed on the display 110 including the main display area 310 and the auxiliary display area 320, a signal generated from the electronic pen 200 may be detected in the auxiliary display area 320.

The auxiliary display area 320 may be formed to extend from each of the opposite sides of the main display area 310. A signal of the electronic pen 200 may be detected through the auxiliary display area 320 extended from one side of the main display area 310.

When a signal of the electronic pen 200 is detected through the auxiliary display area 320 extended from one side of the main display area 310, the electronic device 100 may identify whether a signal of the electronic pen 200 detected through the auxiliary display area 320 is detected in the first area 321 or the second area 322 of the auxiliary display area 320.

An operation of identifying whether a signal of the electronic pen 200 is detected in the first area 321 or the second area 322 of the auxiliary display area 320 is described in detail above, and thus the detailed description thereof will be omitted herein.

As a result of identification, when it is identified that the signal of the electronic pen 200 is detected in the second area 322 of the auxiliary display area 320, the electronic device 100 may carry out an operation for adjusting a volume of the content image 1310 displayed on the display 110 according to the detected signal of the electronic pen 200.

That is, after a signal of the electronic pen 200 is detected in the second area 322 of the auxiliary display area 320, when a signal according to an up-and-down or lateral movement of the electronic device 200 is detected, the electronic device 100 may adjust a volume of the content image 1310 and output it according to a direction of the up-and-down or lateral movement of the electronic pen 200.

When it is identified that the signal of the electronic pen 200 is detected in the first area 321 of the auxiliary display area 320, the electronic device 100 may carry out a different operation from an operation for scrolling the UI screen 1310 displayed on the auxiliary display area 320.

For example, when it is identified that the signal of the electronic pen 200 is detected in the first area 321 of the auxiliary display area 320, the electronic device 100 may change a channel according to the detected signal of the electronic pen, and display a content image of the changed channel through the display 110.

When a signal of the electronic pen 200 is detected through the auxiliary display area 320 extended from the other side of the main display area 310, the electronic device 100 may identify whether a signal of the electronic pen 200 detected through the auxiliary display area 320 is detected in the first area 321 or the second area 322 of the auxiliary display area 320.

An operation of identifying whether a signal of the electronic pen 200 is detected in the first area 321 or the second area 322 of the auxiliary display area 320 is described in detail above, and thus the detailed description thereof will be omitted herein.

As a result of identification, when it is identified that the signal of the electronic pen 200 is detected in the second area 322 of the auxiliary display area 320, the electronic device 100 may change a reproduction section of the content image 1310 displayed on the display 110 according to the detected signal of the electronic pen 200 and display the changed image.

When it is identified that the signal of the electronic pen 200 is detected in the first area 321 of the auxiliary display area 320, the electronic device 100 may carry out a different operation from an operation for changing a reproduction section of the content image 1310 displayed on the display 110.

For example, when it is identified that the signal of the electronic pen 200 is detected in the first area 321 of the auxiliary display area 320, the electronic device 100 may carry out an operation of stopping reproduction of the content image 1310 displayed on the display 110, etc. through the detected signal of the electronic pen 200.

The respective configurations and operations of the electronic device 100 according to an example embodiment have been described above. Hereinbelow, a method for controlling an electronic device 100 according to an example embodiment will be described.

Figure 14:
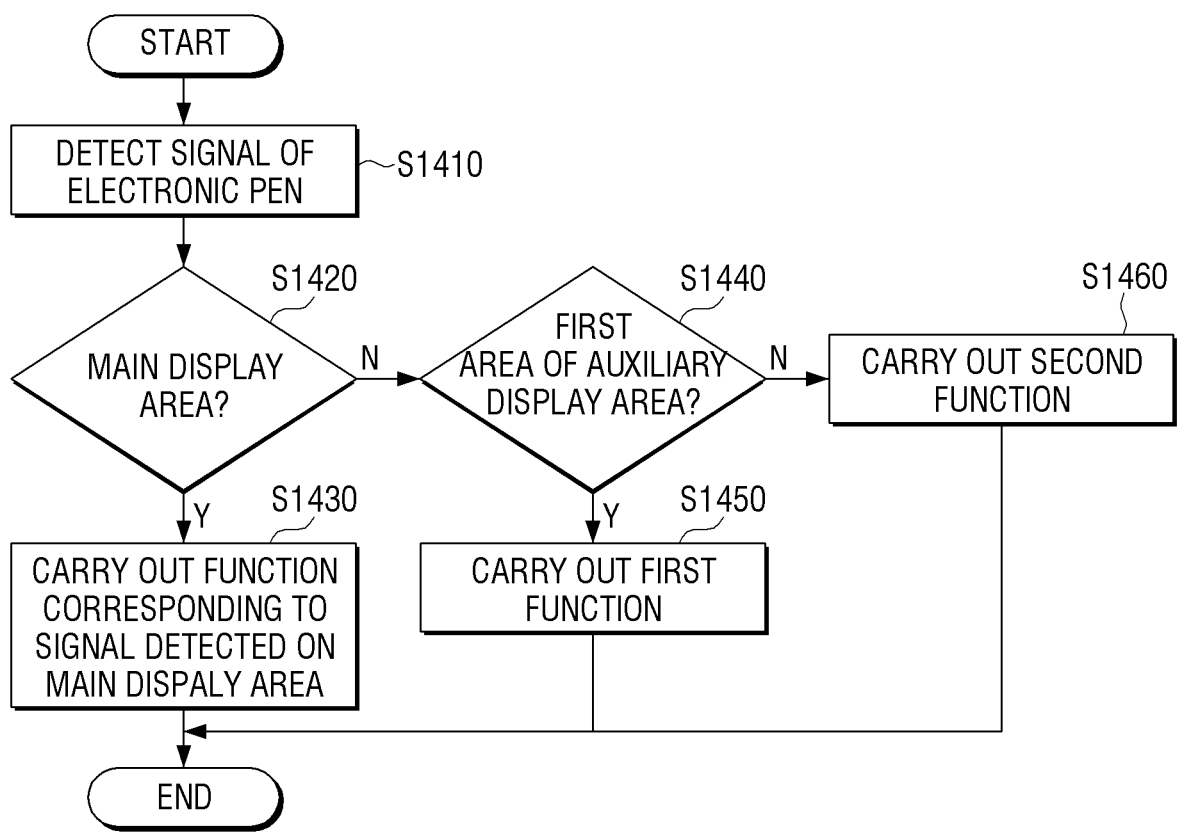
FIG. 14 is a flowchart provided to explain a method for controlling an electronic device according to an example embodiment.

FIG. 14 is a flowchart provided to explain a method for controlling an electronic device according to an example embodiment.

As illustrated in FIG. 14, the electronic device 100 may detect a signal of the electronic pen located on the display, at operation S1410.

The display may include a main display area, and an auxiliary display area which is formed to extend from the main display area and includes a curved surface area.

Thereafter, the electronic device 100 may identify whether a signal generated from the electronic pen 200 located on the display is detected in the main display area of the display, at operation S1420.

As a result of identification, when it is identified that the signal of the electronic pen 200 is detected in the main display area of the display, the electronic device 100 may carry out a function corresponding to the signal of the electronic pen 200 in the main display area, at operation S1430.

For example, in a state in which a UI including at least one item is displayed in the main display area, when it is identified that a signal is detected in the main display area, the electronic device 100 may execute an item located in an area in which the signal is detected from among at least one item included in the displayed UI.

When it is identified that the signal of the electronic pen 200 is detected in the auxiliary display area of the display, the electronic device 10 may identify whether the detected signal of the electronic pen 200 is detected in the first area of the auxiliary display area, at operation S1440.

As a result of identification, when it is identified that the signal of the electronic pen 200 is detected in the first area of the auxiliary display area, the electronic device 100 may carry out a first function by the signal of the electronic pen 200, at operation S1450.

As a result of identification, when it is identified that the signal of the electronic pen 200 is detected in the second area of the auxiliary display area, the electronic device 100 may carry out a second function by the signal of the electronic pen 200, at operation S1460.

The first area may be an area which is connected to the main display area based on a preset reference line from among the auxiliary display area. The second area may be an area which is disconnected from the main display area based on a preset reference line from among the auxiliary display area.

A reference line dividing the auxiliary display area into first and second areas may be a line connecting points satisfying the mathematical formula 1 as shown above.

Accordingly, when it is identified that a signal generated from the electronic pen 200 is detected in the auxiliary display area, the electronic device 100 may identify whether the area at which the signal is detected is a first area or a second area based on a reference line set by the mathematical formula 1 described above, and carry out a function corresponding to the corresponding signal in the identified area.

In an implementation, when it is identified that a signal generated from the electronic pen 200 is detected in the first area of the auxiliary display area, the electronic device 100 may select an object corresponding to a point at which the signal is detected in the first area from among at least one object displayed in the auxiliary display area, and execute the selected object.

When it is identified that a signal generated from the electronic pen 200 is detected in the second area of the auxiliary display area, the electronic device 100 may carry out an operation of scrolling at least one of the main display area and the auxiliary display area.

In another implementation, in a state in which a main display area and an auxiliary display area are deactivated, when a signal generated from the electronic pen 200 is detected in a second area of the auxiliary display area, the electronic device 100 may activate the auxiliary display area to display a UI screen including at least one icon.

In another implementation, when a signal generated from the electronic pen 200 is detected in a second area of the auxiliary display area, the electronic device 100 may carry out a different function.

In detail, the auxiliary display area may include a first auxiliary display area which is formed to extend from one side of the main display area and a second auxiliary display area which is formed to extend from the other side of the main display area.

In a state in which a content is displayed on the display including the main display area and the auxiliary display area, when a signal generated from the electronic pen 200 is detected in the second area of the first auxiliary display area, the electronic device 100 may carry out a first function for controlling a displaying of the content.

In a state in which a content is displayed on the display including the main display area and the auxiliary display area, when a signal generated from the electronic pen 200 is detected in the second area of the second auxiliary display area, the electronic device 100 may carry out a second function for controlling a displaying of the content.

The aforementioned control method of the electronic device 100 according to various example embodiments may be encoded as software and stored in a non-transitory readable medium. The non-transitory readable medium may be installed in various devices.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the present disclosure. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. An electronic device, comprising:
    a display including a main display area and an auxiliary display area extended from the main display area, wherein the auxiliary display area includes a curved surface area connected to the main display area and divided into a first area and a second area based on a reference line, and the first area is an area connected to the main display area and the second area is an area connected to the first area and disconnected from the main display area;
    a sensor configured to detect a signal of an electronic pen located on the display; and
    at least one processor configured to control the electronic device based on the detected signal,
    wherein the at least one processor is further configured to:
      based on a first signal of the electronic pen being detected in the auxiliary display area, display a home screen on the main display area and display a user interface (UI) screen including a plurality of icons on the auxiliary display area,
      based on a second signal of the electronic pen being detected in the auxiliary display area while the UI screen is displayed, identify whether the second signal is detected in the first area of the auxiliary display or in the second area of the auxiliary display area, based on the second signal being detected in the first area of the auxiliary display area, carry out a first function corresponding to the second signal, the first function including selecting an icon among the plurality of icons in the UI screen, and based on the second signal being detected in the second area of the auxiliary display area, carry out a second function corresponding to the second signal and different from the first function, the second function including carrying out an operation for scrolling the UI screen, wherein the reference line is a line connecting points satisfying an equation shown below:

$$D1+D2=D3,$$

where D1 is a shortest distance between a first point of a portion of the display from which the curved surface area starts and a second point at which a signal of the electronic pen is detected, and D2 is a shortest distance between the second point at which the signal of the electronic pen is detected and an extended line that extends from a location of the electronic pen to the curved surface area in a vertical direction perpendicular to a horizontal direction in which the main display area is extending, and D3 is a shortest distance between a point of the portion of the display from which the curved surface area starts and a third point at which the curved surface area ends.

2. The electronic device as claimed in claim 1, wherein the at least one processor is configured to, while the main display area and the auxiliary display area are deactivated, based on a signal of the electronic pen being detected in the second area, activate the auxiliary display area to display the UI screen.

3. The electronic device as claimed in claim 1, wherein the auxiliary display area includes a first auxiliary display area which is configured to extend from one side of the main display area and a second auxiliary display area which is configured to extend from an other side of the main display area, the first auxiliary display area including a first area and a second area, the second auxiliary display area including a first area and a second area, and wherein the at least one processor is configured to:
while a content is displayed on the display, based on a signal of an electronic pen being detected in the second area of the first auxiliary display area, carry out a first function for controlling a displaying of the content, and
while a content is displayed on the display, based on the signal of the electronic pen being detected in the second area of the second auxiliary display area, carry out a second function for controlling a displaying of the content.

4. The electronic device as claimed in claim 1, wherein the auxiliary display area is an edge area of the display.

5. A method for controlling an electronic device, the method comprising:
detecting a signal of an electronic pen located on a display including a main display area and an auxiliary display area configured to extend from the main display area and include a curved surface area divided into a first area and a second area based on a reference line, the first area is an area connected to the main display area and the second area is an area connected to the first area and disconnected from the main display area; and controlling, by at least one processor of the electronic device, the electronic device based on the detected signal, wherein the controlling comprises:
based on a first signal of the electronic pen being detected in the auxiliary display area, displaying a home screen on the main display area and displaying a user interface (UI) screen including a plurality of icons on the auxiliary display area;

based on a second signal of the electronic pen being detected in the auxiliary display area while the UI screen is displayed, identifying whether the second signal is detected in the first area of the auxiliary display or in the second area of the auxiliary display area;

based on the second signal being detected in the first area of the auxiliary display area, carrying out a first function corresponding to the second signal, the first function including selecting an icon among the plurality of icons in the UI screen; and based on the second signal being detected in the second area of the auxiliary display area, carrying out a second function corresponding to the second signal and different from the first function, the second function including carrying out an operation for scrolling the UI screen, wherein the reference line is a line connecting points satisfying an equation shown below:

$$D1+D2=D3,$$

where D1 is a shortest distance between a first point of a portion of the display from which the curved surface area starts and a second point at which a signal of the electronic pen is detected, and D2 is a shortest distance between the second point at which the signal of the electronic pen is detected and an extended line that extends from a location of the electronic pen to the curved surface area in a vertical direction perpendicular to a horizontal direction in which the main display area is extending, and D3 is a shortest distance between a point of the portion of the display from which the curved surface area starts and a third point at which the curved surface area ends.

6. The method as claimed in claim 5, wherein the controlling comprises:
while the main display area and the auxiliary display area are deactivated, based on a signal of the electronic pen being detected in the second area, activating the auxiliary display area to display the UI screen.

7. The method as claimed in claim 5, wherein the auxiliary display area includes a first auxiliary display area which is configured to extend from one side of the main display area and a second auxiliary display area which is configured to extend from an other side of the main display area, the first auxiliary display area including a first area and a second area, the second auxiliary display area including a first area and a second area, and wherein the controlling comprises:
while a content is displayed on the display, based on a signal of the electronic pen being detected in the second area of the first auxiliary display area, carrying out a first function for controlling a displaying of the content; and
while a content is displayed on the display, based on the signal being detected in the second area of the second auxiliary display area, carrying out a second function for controlling a displaying of the content.

8. The method as claimed in claim 5, wherein the auxiliary display area is an edge area of the display.

9. A computer program product that includes a non-transitory computer recording medium for storing a computer program that is capable of being executed by a user terminal, the computer program comprising:
- an operation of detecting a signal of an electronic pen located on a display including a main display area and an auxiliary display area configured to extend from the main display area and include a curved surface area divided into a first area and a second area based on a reference line, and the first area is an area connected to the main display area and the second area is an area connected to the first area and disconnected from the main display area; and
- an operation of controlling the user terminal based on the detected signal,
- wherein the operation of controlling comprises:
- based on a first signal of the electronic pen being detected in the auxiliary display area, display a home screen on the main display area and display a user interface (UI) screen including a plurality of icons on the auxiliary display area,
- based on a second signal of the electronic pen being detected in the auxiliary display area while the UI screen is displayed, identifying whether the signal is detected in the first area of the auxiliary display or in the second area of the auxiliary display area,
- based on the second signal being detected in the first area of the auxiliary display area, carrying out a first function corresponding to the second signal, the first function including selecting an icon among the plurality of icons in the UI screen; and
- based on the second signal being detected in the second area of the auxiliary display area, carrying out a second function corresponding to the second signal and different from the first function, the second function including carrying out an operation for scrolling the UI screen,
- wherein the reference line is a line connecting points satisfying an equation shown below:

$D1+D2=D3,$ where D1 is a shortest distance between a first point of a portion of the display from which the curved surface area starts and a second point at which a signal of the electronic pen is detected, and D2 is a shortest distance between the second point at which the signal of the electronic pen is detected and an extended line that extends from a location of the electronic pen to the curved surface area in a vertical direction perpendicular to a horizontal direction in which the main display area is extending, and D3 is a shortest distance between a point of the portion of the display from which the curved surface area starts and a third point at which the curved surface area ends.

10. The computer program product as claimed in claim 9, wherein the operation of controlling comprises:
- while the main display area and the auxiliary display area are deactivated, based on a signal of the electronic pen being detected in the second area, activating the auxiliary display area to display the UI screen.

11. The computer program product as claimed in claim 9, wherein the auxiliary display area includes a first auxiliary display area which is configured to extend from one side of the main display area and a second auxiliary display area which is configured to extend from an other side of the main display area, the first auxiliary display area including a first area and a second area, the second auxiliary display area including a first area and a second area, and
- wherein the operation of controlling comprises:
- while a content is displayed on the display, based on a signal of the electronic pen being detected in the second area of the first auxiliary display area, carrying out a first function for controlling a displaying of the content; and
- while a content is displayed on the display, based on the signal being detected in the second area of the second auxiliary display area, carrying out a second function for controlling a displaying of the content.

12. The computer program product as claimed in claim 9, wherein the auxiliary display area is an edge area of the display.

* * * * *